United States Patent [19]

Takai et al.

[11] 4,141,722
[45] Feb. 27, 1979

[54] METHOD OF TREATING FERRUGINOUS SLAGS

[75] Inventors: Kiyoshi Takai, Nishinomiya; Naraharu Yamamoto, Suita; Seiichi Yamamoto, Osaka, all of Japan

[73] Assignee: Osaka Iron & Steel Co., Ltd., Osaka, Japan

[21] Appl. No.: 761,981

[22] Filed: Jan. 24, 1977

[30] Foreign Application Priority Data

Feb. 10, 1976 [JP] Japan .................................. 51-12795

[51] Int. Cl.² ............................................... C22B 7/04
[52] U.S. Cl. .................................... 75/24; 106/288 B
[58] Field of Search .................. 106/117, 51, 288 B; 75/24, 30; 65/19, 20; 423/632

[56] References Cited

U.S. PATENT DOCUMENTS

| 982,945 | 1/1911 | Von Forell | 106/117 |
| 4,049,439 | 9/1977 | Nakamura et al. | 75/24 |

FOREIGN PATENT DOCUMENTS 1170084  11/1969  United Kingdom ..................... 106/117

Primary Examiner—M. J. Andrews
Attorney, Agent, or Firm—Kane, Dalsimer, Kane, Sullivan and Kurucz

[57] ABSTRACT

The disclosure is of a method of treating ferruginous metallurgical slags to lower basicity, stabilize their composition, reduce their melting point and stabilize the slag in regard to dusting and slaking. The stabilized slag is useful as an artificial sand or as an aggregated sand useful in the manufacture of concrete and like compositions.

7 Claims, 1 Drawing Figure

METHOD OF TREATING FERRUGINOUS SLAGS

BACKGROUND OF THE INVENTION

1. Field of the Invention

The invention relates to steel making and more particularly relates to improving stability of the slag by-product of steel making.

2. Brief Description of the Prior Art

As is well known, converter slag is a highly basic slag by-product of a converter steel making plant. Table 1 below shows the chemical compositions of converter slag and blast furnace slag, their basicity and melting points. As is seen in the Table 1 basicity of converter slag ($CaO/SiO_2$) is as high as 2.5 – 4.7. This is a higher range than that of blast furnace slag. Also as shown the chemical composition of converter slag, particularly calcium dioxide, silicon dioxide and iron contents may vary largely depending on operating conditions under which it is formed.

Table 1

| Chem. Comp. | Blast Furnace Slag | Converter Slag |
|---|---|---|
| CaO | 40 – 43% | 35 – 59% |
| $SiO_2$ | 32 – 36% | 10 – 18% |
| $Al_2O_3$ | 12 – 18% | 0.5 – 1.5% |
| Fe* (Total) | 0.2 – 1.2% | 8.0 – 25.0% |
| MgO | 2.0 – 7.0% | 1.2 – 4.0% |
| MnO | 0.5 – 2.0% | 1.0 – 8.0% |
| $TiO_2$ | 0.5 – 2.2% | 0.5 – 1.5% |
| $P_2O_5$ | 0.02 – 0.10% | 1.5 – 3.0% |
| S | 0.70 – 1.50% | 0.06 – 0.20% |
| F | tr | 0.3 – 0.9% |
| $CaO/SiO_2$ Basicity | 1.1 – 1.3 | 2.5 – 4.7 |
| Melting Point ° C. | 1,360° – 1,430° | 1,450° – 1,630° |

*The percentage of Fe, sometimes referred to hereinafter as "Total Fe" or "Total iron" and as found throughout the specification and/or used in the claims, means the iron content contributed by ferrous oxide and ferric oxide. It does not include small iron particles physically mixed in the slag.

As shown in Table 1, the melting point of converter slag is 1,450° C. –1,630° C. or 80° C. – 130° C. higher than the melting point of blast furnace slag (1,360° C. – 1,430° C.). Therefore, fluidity of the converter slag is inferior to blast furnace slag fluidity at the same temperature. In fact, converter slag is considered a very viscous slag. Because of its relatively high melting point, converter slag held in a slag ladle easily forms a solidification layer at its surface. Solidification at the contact surface between the ladle inside wall and the molten slag also usually proceeds speedily. Further, even when thin multiple castings of slag is carried out in a dry pit, thin slag flow is difficult due to poor fluidity of the converter slag and results in formation of a partially lump type slag.

Prior hereto, only converter slag of good fluidity was granulated in conventional granulation equipment. The amount of converter slag which could be safely granulated is only 20 to 40% of the total slag. The operation is very dangerous, often resulting in an explosion. The cause of the explosion phenomenon is not clearly understood. Theories of the cause include the following. First the temperature of converter slag at the time of granulation is 1,500° C. – 1,650° C. This temperature is very near to the melting point of fine metallic iron particles usually found dispersed in molten slag as well as very near to the melting point of comparatively large metallic iron grains poured into the ladle and inter mixed with the slag at the time of slag tapping. When this metallic iron comes into contact with cooling water the following reaction proceeds very rapidly:

$$Fe + H_2O \rightarrow FeO + H_2$$

The hydrogen gas formed reacts explosively in air. Secondly, since the fluidity of converter slag is very poor compared to blast furnace slag, the flow rate of the converter slag from the ladle is not uniform and part of the slag becomes the semi-molten lump type in water. Water surrounding the lump and water drawn into the lump rapidly vaporizes from the latent heat of the lump; rapid expansion of the vapor leads to decomposition. At the same time due to the presence of metallic iron particles contained in the lump, decomposition will proceed readily. Large explosions may be caused by a combination of the effects of these causes. At any rate, explosions during granulation of the converter slag indicates clearly that the explosion has a close relationship with the presence of metallic iron particles in the slag and with slag fluidity.

As mentioned above, fine metallic iron particles are usually found solidified in converter slag. These iron particles are not included in the Fe percent shown in Table 1, supra. During oxygen blowing in the converter, fine metallic iron particles are sprayed with the oxygen jet into the molten slag, and are physically dispersed, then solidified in the slag. Therefore these fine metallic particles are always observed in the converter slag tapped. Usually the proportion of these metallic iron particles is within the range of from 2 to 10% by weight of the converter slag.

The fine metallic iron particles observed in solidified converter slag are oxidized with time to show the characteristic ferruginous red-brown color. These iron particles eventually fall off the slag surface, giving an undesired effect to the converter slag, limiting its utilization. Although some differences are observed depending on cooling speed and treating method, slaking phenomenon caused by chemical change of free lime in the converter slag is observed with time, both in the case of lump type slag and in particle type slag. Dusting phenomenon is also observed, caused by expansion of slag from the inside. This occurs with aging. Also when the converter slag contacts rain water, large amounts of free lime are leached away, dissolved in the water. This is not always desirable for the environment. Apparently quick lime charged into the converter during steel making is not necessarily completely slagged, but quick lime is known to be uniformly dispersed in the slag microscopically.

After surveying actual converter operation, we confirmed that there was a close relationship between slag basicity and unslagged lime content. With the increase of slag basicity $CaO/SiO_2$, unslagged quick lime content is increased and if the basicity falls below 2.0, unslagged quick lime is not readily observed. Since the basicity of converter slag is as high as 2.5 – 4.7, formation of complex compounds consisting mainly of $3CaO.SiO_2$ (basicity 2.8) or calcium ferrites ($CaO.Fe_2O_3$ or $2CaO.Fe_2O_3$) among various oxides such as CaO, $SiO_2$, $Al_2O_3$, FeO, $Fe_2O_3$, MgO, $P_2O_5$ occurs. These compounds are said to be decomposed into complex compounds mainly consisting of $2CaO.SiO_2$ (basicity 1.86) and free lime during the process of cooling the slag. In the second process, $2CaO.SiO_2$, which is the main composition of the complex compounds, transform $\alpha \rightarrow \alpha' \rightarrow \beta \rightarrow \gamma$ in the cooling process and is said to become stable γ 2CaO.SiO$_2$ at room temperature. In the transformation from β type to γ type, a volume increase is accompanied therefore by the expansion of the slag causing the dusting phenomenon.

Compositions like MnO and P$_2$O$_5$ have the effect of preventing transformation of β type to γ type, but FeO is said to have an effect of helping the above transformation. Therefore the fact that total Fe is high in the converter slag means that the slag is in the condition of encouraging the dusting phenomenon.

It is very difficult to differentiate between free lime and unslagged lime content in the practical converter slag. The lime content may be causing the undesired slaking phenomenon by forming stable calcium hydroxide [Ca(OH)$_2$] in contact with water.

Although the above are theories not yet proved, converter slag has basic properties which result in the undesired dusting phenomenon by expansion and the undesired slaking phenomenon by contact with water. These are detrimental to effective utilization of the converter slag.

Our invention provides a method which solves the problems described above as associated with converter slags. That is, by this invention the basicity of the slag is lowered, composition fluctuation is reduced, the melting point of the slag is lowered as much as possible and its fluctuation is decreased. At the same time, iron particle content in the slag is lowered. The result is a reduction in the defects associated with basicity of the slag and iron particle content.

In the past in order to improve the chemical composition of converter slag a method of making synthetic slag of desired chemical composition by adding powder materials was considered. However, the above method is disadvantageous in that large amounts of energy are required to melt the solid addition materials.

Our invention offers a means of using converter slag by removing its basic defects. The invention can also be applied widely to ferruginous metallurgical slags such as the slag by-product of electric steel making and open-hearth furnace processes.

SUMMARY OF THE INVENTION

The invention comprises a method of improving a ferruginous metallurgical slag, which comrpises;

(a) adjusting the composition of the molten slag so as to include 2.0 to 8.0 parts by weight of total Fe and 7.0 to 18.0 parts by weight of Al$_2$O$_3$ and a basicity (CaO/SiO$_2$) of 1.3 – 1.65;

(b) oxidizing metallic iron in the molten slag; and (c) cooling the slag under conditions which yield a lump type slag.

The invention also comprises the product slag of the method of the invention. The product slag is useful as an artificial sand and as an aggregate sand for preparing concrete and the like.

DETAILED DESCRIPTION OF THE PREFERRED EMBODIMENTS OF THE INVENTION

Figure 1:
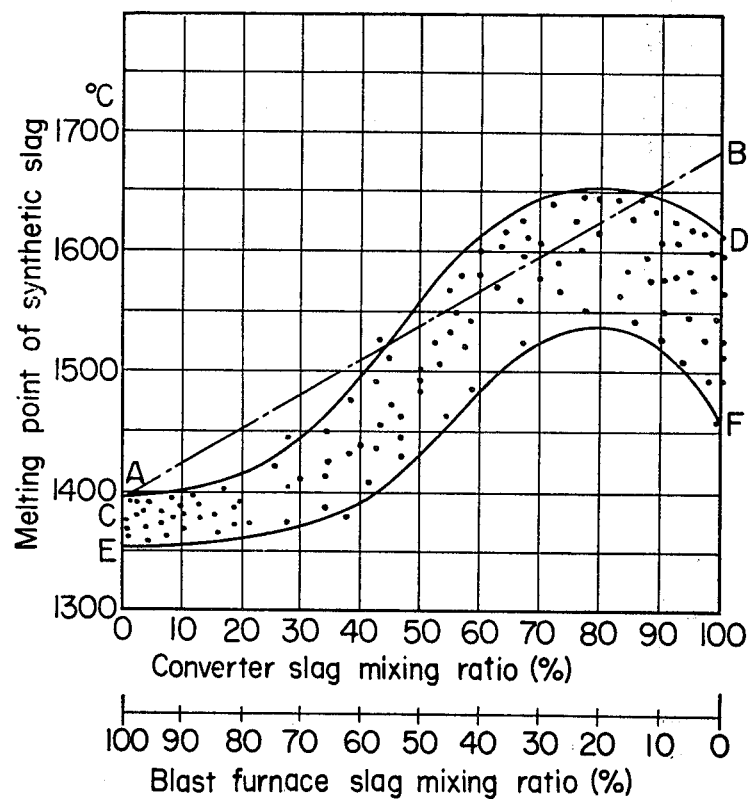
FIG. 1 shows graphically the relationship between the mixing ratio of blast furnace slag and converter slag and the melting point of a slag improved by the method of the invention.

The following description of the invention will be directed to the improvement of converter slag, but the basic principles apply to any ferruginous metallurgical slag having a chemical composition similar to that of converter slag.

The first step in the process of the invention calls for adjusting the composition of the molten converter slag so that it has a basicity (CaO/SiO$_2$) of from about 1.3 to about 1.65 and contains from about 2.0 to 8.0 parts of total Fe and from about 7.0 to 18.0 parts of Al$_2$O$_3$. Preferably adjusting is carried out by mixing blast furnace slag with the converter slag to be treated by the method of the invention.

The chemical composition and melting points of blast furnace slag and converter slag used in the invention may be widely varied as shown in Table 1. For example, the basicity of blast furnace slag (CaO/SiO$_2$) may be from 1.1 – 1.3, and their melting points may be 1,360° C. – 1,430° C. The basicity of converter slags (CaO/SiO$_2$) may be from 2.5 – 4.7, and their melting points may be from 1,450° C. – 1,630° C.

In the case of converter slag, total Fe content differs largely even for slags of the same basicity because of varied operating conditions of the converter. Therefore large fluctuations of melting points among the slags occurs naturally.

Blast furnace slags and converter slags having various compositions as obtained from actual steel making operations were mixed in various ratios and the melting points of the fused synthetic slags obtained were measured. The term "synthetic slag" as used herein means a slag whose composition is adjusted to that specific herein prior to oxidation according to this method of the invention. The results of these experiments is shown in FIG. 1. In FIG. 1, the upper limit of melting points is shown by the CD curve, and the lower limit is shown by the EF curve. Almost all melting points of samples tested were found to lie within this temperature range. In the FIG. 1, mixing ratios are shown based on the sum of blast furnace slag and converter slag being 100. The melting point of synthetic slag obtained for a mixing of from 0% to 20% by weight converter slag with blast furnace slag is from 1,360° C. to 1,410° C. This is almost the same melting point for blast furnace slags. The melting point of the synthetic slag increases from 1,370° C. to 1,450° C. when the proportion of converter slag is increased from 20% to 30%. If the proportion of converter slag is more than 30% of the mixture, the melting point increases rapidly and the difference between maximum value and minimum value becomes large. For synthesized slags containing 70% to 80% of converter slag the melting point reaches its highest value and may exceed 1,650° C. If the proportion of converter slag is over 80% of the slag mixture, the melting point is unexpectedly lowered; this is a new finding. The fact that the melting point of converter slag fluctuates from 1,630° C. to 1,450° C. was found to be controlled by its basicity and total Fe content by this experiment. The melting point of a synthetic slag formed by melting a mixture of converter slag and blast furnace slag at various ratios is not predictable from the melting points of both slags and the mixing ratios. When the proportion of converter slag is 70% – 80% by weight of the synthetic slag, the melting point of the synthetic slag shows an extraordinary high value. This was found to be true from basic studies separately carried out on quarterly of the equilibrium diagram CaO - SiO$_2$ - Al$_2$O$_3$ - FeO and analysis of the result.

Blast furnace slag is generally charged into a slag ladle and kept there after the slag is tapped from the furnace. After some time, the surface of the molten slag is solidified. However, the temperature drop inside the ladle is very slow and a molten slag temperature of 1,360° C. – 1,400° C. may be kept for comparatively long time periods. In contradistinction the temperature of converter slag when charged into the ladle is from 1,650° C. to 1,750° C. and if the slag is kept in the ladle, solidification of the surface layer proceeds rapidly and the solidified layer becomes thicker more rapidly. The temperature of such molten slag on the inside is usually lowered by 150 – 200° C. very rapidly after charging. Therefore, when converter slags and blast furnace slags are mixed in the molten state as in the case of the method of this invention, converted slag may be directly charged into the ladle previously charged with a predetermined amount of blast furnace slag. By this method, large amounts of energy contained in the converter slag can be effectively utilized and formation of solidified surface layers will be insignificant. This invention is not limited to such mixing. The object of this invention can also be accomplished by mixing the slags in a container which can hold both slags in the required proportions.

The reason why the chemical composition of the synthetic slag used in the process of the invention is limited to specified ranges of specified basicity and components is as follows. The first reason is that if comparatively large temperature difference exists between the temperature of synthetic slag formed by mixing blast furnace slag and converter slag and the melting point of the synthetic slag, the succeeding steps of the process of the invention can be advantageously carried out. For example when blast furnace slag kept at 1,390° C. is mixed with converter slag kept at 1,680° C. in a slag ladle uniformly, the temperature of the synthetic slag is shown by line AB in FIG. 1. It is nearly a straight line relationship with the mixing ratio of the two slags. The melting point of the synthetic slag obtained is almost within the temperature range contained by the CD curve and the EF curve as was described above. Thus, if the temperature of the synthetic slag is 50° C. – 100° C. higher than the melting point of the synthetic slag, succeeding steps of the process of the invention can be advantageously carried out. Thus the mixing ratio of slags is desirably limited to 40% by weight of converter slag and 60% by weight blast furnace slag. The synthetic slag within such range has good fluidity and enables one to use a thin, multiple layer flow operation in a pit as described hereinafter.

The second reason is the following. Any prior art converter slag cannot avoid the disadvantages of the dusting and slaking phenomena previously described because of its chemical composition. By the method of our invention, converter slags can be transformed to stable chemical compositions. That is, by making the basicity ($CaO/SiO_2$) of the slag less than 1.65, unslagged lime existing in the converter slag may be completely dissolved in the slag. Further, complicated compounds (consisting mainly of $3CaO.SiO_2$) existing in the highly basic slag disappear and the amount of complicated compounds consisting mainly of $2CaO.SiO_2$ decreases greatly. Therefore, extraordinary expansion associated with the transformation $\alpha \rightarrow \beta \rightarrow \gamma$ of these compounds decreases greatly.

Most of the total Fe content of converter slag exists in the form of FeO. Therefore total Fe content can be decreased easily by mixing with blast furnace slag. This is advantageous, particularly from the point of preventing dusting of slag. Thus, total Fe content is specified to 2 – 8%. The reason why $Al_2O_3$ content in the synthetic slag is limited to less than 18% is to lower the melting point of the slag. If the proportion of converter slag mixed with blast furnace slag is chosen so that the synthetic slags have the composition specified herein, the succeeding steps of the process of the invention will achieve the desired result. In general, 1.5 to 9.5 parts of blast furnace slag weight is required for mixing with 1 part of converter slag. If the synthetic slag thus produced is rapidly cooled or slowly cooled, slag comparable to blast furnace slag in properties (which is small in free lime) and has almost no slaking and dusting disadvantages may be obtained. However, even after mixing blast furnace slag with converter slag within the specified composition range, fine metallic iron particles dispersed in the original converter slag still exist as a problem. To remove these fine, metallic iron particles we discovered that metallurgical oxidation by blowing oxygen containing gas into the molten slag is effective. The fine metallic iron particles are burnt to oxide and slagged. Since the molten slag is vigorously agitated by the oxygen containing gas, uniform mixing of blast furnace slag and converter slag (which have different viscosity, specific gravity and temperature) is effectively carried out.

In blowing an oxygen containing gas into the molten slag through a lance, the higher the $O_2$ content in the gas the stronger is the oxidation reaction. There is an increase in the temperature of the synthetic slag proportional to oxidation. If the temperature of the resulting oxidized slag is too high it may be lowered by adding a less oxidative gas to the oxygen containing gas, for example by the addition of air or nitrogen.

By the method of the invention, oxygen containing gas is specified to be blown into the molten slag through a lance. The lance is preferably immersed in the molten slag, but it may also be positioned above the slag surface.

The process of the invention is further described in the following. Fine metallic iron particles in the molten slag are kept at 1,400° C. – 1,450° C. since they are heated by contact with the synthetic molten slag. Therefore if they come into contact directly with oxygen they are oxidized instantaneously. The FeO in the molten synthetic slag is oxidized to $Fe_2O_3$. Therefore fine metallic iron particles dispersed in molten synthetic slag are very speedily removed by oxidation. The iron oxide formed by oxidation of the fine metallic iron particles is transformed into the slag, and helps to decrease the free lime content when the slag is solidified.

In this invention, by blowing an oxygen containing gas into the synthetic molten slag, oxidation of metallic iron and admixtures of the molten slags are simultaneously carried out. This is an advantage of the method of the invention.

The fluidity of the oxidized molten slag after fine metallic iron particles are removed becomes as good as that of blast furnace slag. Therefore if it is desired to granulate the slag, the hazard of explosion is reduced. Thus, the conventional equipment for blast furnace slag granulation can be used without danger. The granulated slag thus formed has greater strength than blast furnace granulated slag, since basicity, total Fe content, specific gravity and density of the product slag are improved over blast furnace slag. The free lime content of 0.05 – 0.08% is almost the same as that of blast furnace slag, and is much lower than the free lime content (0.3 –

1.5%) of converter granulated slag. Thus the granulated slag obtained by the method of this invention has a high specific gravity 3.79 is charged and mixed. Then the ladle is moved to a molten slag treating place.

Table 2

| Kind | Item Basicity $CaO/SiO_2$ | Chemical composition % | | | | | | | | | Metallic* iron% | Temperature at mixing time ° C. |
|---|---|---|---|---|---|---|---|---|---|---|---|---|
| | | $SiO_2$ | CaO | $Al_2O_3$ | Total Fe | MnO | $TiO_2$ | MgO | $P_2O_5$ | S | | |
| blast furnace slag | 1.21 | 35.09 | 42.46 | 14.02 | 0.80 | 0.56 | 0.73 | 2.46 | 0.04 | 1.45 | — | 1,410 ° C. |
| converter slag | 3.95 | 13.12 | 51.83 | 0.82 | 17.62 | 4.11 | 1.55 | 3.14 | 2.32 | 0.20 | 4.5 | 1,650 |

*Metallic iron content, which is physically mixed in the converter slag and which is different from total Fe as previously defined.

value.

When thin multiple layer casting of slag after oxidation treatment is carried out in a pit the obtained lump type slag has very superior physical properties, particularly in mechanical strength in comparison to blast furnace slag, since the free lime content is lower.

According to the above described method of this invention, if chemical composition of tapped molten converter slag is supposed, and blast furnace slag volume is pre-set to obtain synthetic molten slag having the desired chemical composition, we can obtain slag which may be effectively applied without any danger, regardless of the basicity and the composition of the converter slag.

The following example is given to describe the manner and process of making and using the invention and sets forth the best mode contemplated by the inventors of carrying out the invention but is not to be construed as limiting.

EXAMPLE 1

To a ladle, in which 12 tons of blast furnace molten slag having the composition shown in Table 2, CaO/$SiO_2$ basicity 1.21 temperature at 1,410° C., and specific gravity 2.91 is held, 4 tons of molten converter slag, having the chemical composition shown in Table 2, basicity ($CaO/SiO_2$) 3.95, temperature 1,650° C. and After 7 minutes the resulting slag is cast into a smooth pit having a section of width 3 m × length 6 m., and slowly cooled to solidify. Then the slag in the pit is divided into 18 equal parts. Slag samples are taken from each part and analyzed for chemical composition. The results are shown in Table 3 below.

Table 3

| Kind | Item Basicity $CaO/SiO_2$ | Chemical composition % | | | | | | | | | Metallic iron* % |
|---|---|---|---|---|---|---|---|---|---|---|---|
| | | $SiO_2$ | CaO | $Al_2O_3$ | Total Fe | MnO | $TiO_2$ | MgO | $P_2O_5$ | S | |
| Theoretical chemical composition of synthetic slag | 1.51 | 29.60 | 44.80 | 10.72 | 5.01 | 1.45 | 0.94 | 2.63 | 0.61 | 1.14 | 1.13 |
| Actual chemical composition of synthetic slag | 1.46~ 1.61 | 28.20~ 31.15 | 43.55~ 45.90 | 8.26~ 13.15 | 3.95~ 6.09 | 1.16~ 1.74 | 0.79~ 1.08 | 2.50~ 2.86 | 0.39~ 0.82 | 0.90~ 1.42 | 0.65~ 2.72 |

*Metallic Iron, supra.

The theoretical chemical composition described in Table 3 means the chemical composition predicted from the mixing ratio of blast furnace slag and converter slag on the assumption that both are completely mixed.

Actual chemical composition of the synthetic slag showed considerable variation depending on sampling places as shown in Table 3. This shows that uniform compositional structure cannot be obtained by natural mixing. Particularly physically mixed metallic iron content variation is marked.

To the remaining 12 tons of synthetic slag after the first casting into the pit, pure oxygen is blown through ¾″ diameter steel pipe for 8 minutes at 4 Nm³ per minute. After oxidation and agitation is carried out completely, about 6 tons of slag is cast into a smooth pit of the same dimensions previously described. The slag is slowly cooled and solidified. Sampling of synthetic slag was made from 18 parts as before, and their chemical compositions were analyzed. The result is shown in Table 4.

Table 4

| Kind | Item Basicity $CaO/SiO_2$ | Chemical composition % | | | | | | | | | Metallic iron particle content % |
|---|---|---|---|---|---|---|---|---|---|---|---|
| | | $SiO_2$ | CaO | $Al_2O_3$ | Total Fe | MnO | $TiO_2$ | MgO | $P_2O_5$ | S | |
| Theoretical chemical composition of synthetic slag | 1.51 | 29.60 | 44.80 | 10.72 | 6.14 | 1.45 | 0.94 | 2.63 | 0.61 | 1.14 | 0 |
| Chemical composition of synthetic slag after oxygen mixing | 1.49~ 1.54 | 29.49~ 30.45 | 44.50~ 45.43 | 10.18~ 11.61 | 5.72~ 6.58 | 1.12~ 1.59 | 0.82~ 1.06 | 2.38~ 2.81 | 0.52~ 0.73 | 0.50~ 0.77 | 0.02~ 0.04 |

As is shown in Table 4, variation of the chemical composition of synthetic slag cast into the pit after oxygen blowing is very small. Particularly, metallic iron particles physically mixed in the slag showed low value, since they were removed by oxidation.

Right after No. 2 casting, 3 tons of the remaining synthetic molten slag is granulated slagged by granulated slag treating equipment. The fluidity of the molten slag is good and constant volume flow easily obtained without explosion. The chemical composition of the granulated slag is shown in Table 5. Variation of composition and physically mixed metallic iron particles showed very low values.

Table 5

| Item Kind | Basicity CaO/SiO$_2$ | Chemical composition % | | | | | | | | | Metallic iron particle content % |
|---|---|---|---|---|---|---|---|---|---|---|---|
| | | SiO$_2$ | CaO | Al$_2$O$_3$ | Total Fe | MnO | TiO$_2$ | MgO | P$_2$O$_5$ | S | |
| Theoretical chemical composition of synthetic slag | 1.51 | 29.60 | 44.80 | 10.72 | 6.14 | 1.45 | 0.94 | 2.63 | 0.61 | 1.14 | 0 |
| Chemical composition of granulated slag | 1.48~1.53 | 29.06~29.94 | 44.40~45.28 | 10.22~11.42 | 5.74~6.48 | 1.44~1.86 | 0.78~1.04 | 2.39~2.62 | 0.37~0.64 | 0.48~0.65 | 0.02~0.03 |

In the above example, properties of solidified product slag after oxidation treatment and slow cooling and those of solidified slags cast into the same pit of blast furnace slag and converter slag are shown in Table 6.

Free lime content of the product slag and that of blast furnace slag are almost the same. That of converter slag is about 20 times greater. The physical strength of the product slag is much greater than that of blast furnace slag.

Properties of product slag and blast furnace slag after granulation are shown in Table 7. The difference of free lime content is hardly noticeable. The free lime content of the product slag was proved to be far smaller than that of converter slag (0.3%– 1.5%). The product slags produced by the method of the invention have stabilized chemical compositions and they can be utilized without pollution problems.

What is claimed:

1. A method of improving a ferruginous metallurgical slag selected from the class of slags having a chemical composition including metallic iron, 35 to 59 parts by weight calcium oxide, 10 to 18 parts by weight silicon dioxide, 8 to 25 parts by weight total iron and a basicity (CaO/SiO$_2$) of more than 1.65, which comprises;
   (a) providing said slag in a molten state;
   (b) adjusting the composition of the molten slag so as to include 2.0 to 8.0 parts by weight of total iron and 7.0 to 18.0 parts by weight Al$_2$O$_3$ and a basicity (CaO/SiO$_2$) of 1.3 – 1.65;
   (c) oxidizing metallic iron in the molten slag by blowing an oxygen containing gas into the adjusted molten slag; and
   (d) cooling the slag under conditions which yield a lump type slag, whereby the slag is stabilized against dusting and slaking.

2. A method according to claim 1 wherein said adjusting is carried out by mixing molten blast furnace slag with said molten slag in a weight ratio of 1:1.5 to 1:9.5.

3. A method according to claim 1 wherein said oxidation is carried out by blowing an oxygen containing gas through a lance pipe and into the molten slag.

4. A method according to claim 1 wherein said cooling is slow.

5. A method according to claim 1 wherein said cooling is rapid.

6. A method according to claim 1 wherein said slag selected has a basicity (CaO/SiO$_2$) of 2.5 – 4.7.

Table 6

| Item Kind | Basicity (CaO/SiO$_2$) | Free lime % | Physical properties | | | |
|---|---|---|---|---|---|---|
| | | | Weight of unit volume kg/l | True specific gravity | Compression fracture strength kg/cm$^3$* | One direction compression strength kg/cm$^2$ |
| blast furnace slag | 1.21 | 0.182 | 1.84 | 2.91 | 122.1 | 22.0 |
| converter slag | 3.95 | 4.145 | 2.90 | 3.79 | — | — |
| Product slag | 1.52 | 0.195 | 2.10 | 3.14 | 240.5 | 35.1 |

*By Brazilian strength test

Table 7

| Item Kind | Basicity (CaO/SiO$_2$) | Free lime % | Particle Size | | | | | Average mm |
|---|---|---|---|---|---|---|---|---|
| | | | 5 – 3 mm | 3 – 2 mm | 2 – 1 mm | 1 – 0.5 mm | less than 0.5 mm | |
| Blast furnace slag | 1.21 | 0.05 | 2.9% | 14.8% | 46.8% | 27.5% | 8.0% | 1.41 |
| Product slag | 1.50 | 0.07 | 3.0 | 15.1 | 46.7 | 27.6 | 7.6 | 1.43 |

7. A method according to claim 1 wherein said slag selected is converter slag.

* * * * *